US012688105B2

(12) United States Patent
Kim

(10) Patent No.: US 12,688,105 B2
(45) Date of Patent: Jul. 21, 2026

(54) APPARATUS FOR PROCESSING A DEEP LEARNING MODEL AND A METHOD THEREOF

(71) Applicants: HYUNDAI MOTOR COMPANY, Seoul (KR); KIA CORPORATION, Seoul (KR)

(72) Inventor: Jin Sol Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 800 days.

(21) Appl. No.: 18/096,650

(22) Filed: Jan. 13, 2023

(65) Prior Publication Data

US 2024/0095142 A1    Mar. 21, 2024

(30) Foreign Application Priority Data

Sep. 21, 2022    (KR) ......................... 10-2022-0119485

(51) Int. Cl.
G06F 11/34 (2006.01)
G06F 11/30 (2006.01)

(52) U.S. Cl.
CPC .......... G06F 11/34 (2013.01); G06F 11/3037 (2013.01)

(58) Field of Classification Search
CPC ....... G06F 11/34; G06F 11/3037; G06N 3/04; G06N 3/08; G06N 3/063
See application file for complete search history.

(56) References Cited

U.S. PATENT DOCUMENTS

| | | | |
|---|---|---|---|
| 10,996,877 | B2 | 5/2021 | Sasamoto et al. |
| 11,321,132 | B2 | 5/2022 | Choi et al. |
| 11,829,862 | B2 | 11/2023 | Yu et al. |
| 12,333,418 | B2 | 6/2025 | Yu et al. |
| 2019/0361620 | A1 | 11/2019 | Sasamoto et al. |
| 2019/0370630 | A1 | 12/2019 | Yang |
| 2020/0342284 | A1 | 10/2020 | Buyuktosunoglu et al. |
| 2021/0124617 | A1 | 4/2021 | Choi et al. |
| 2021/0174177 | A1 | 6/2021 | Yu et al. |

(Continued)

FOREIGN PATENT DOCUMENTS

| | | |
|---|---|---|
| JP | 2019207458 A | 12/2019 |
| KR | 20210017835 A | 2/2021 |

(Continued)

OTHER PUBLICATIONS

Office Action cited in Korean application No. 10-2022-0119485; Oct. 22, 2025; 20 pp.

(Continued)

*Primary Examiner* — Kamran Afshar
*Assistant Examiner* — Brian J Hales
(74) *Attorney, Agent, or Firm* — Lempia Summerfield Katz LLC

(57) ABSTRACT

An apparatus for processing a deep learning model includes a first memory, a second memory, and a controller. The controller is configured to, for each layer of the deep learning model, detect memory usage, a first processing time corresponding to the first memory being used, and a second processing time corresponding to the second memory being used, and determine an optimal memory for each layer of the deep learning model based on an objective function.

18 Claims, 6 Drawing Sheets

(56)  References Cited

U.S. PATENT DOCUMENTS

| | | | | |
|---|---|---|---|---|
| 2021/0209419 A1* | 7/2021 | Ramnani | ............... | G06F 9/5077 |
| 2023/0013998 A1* | 1/2023 | Mody | .................... | G06N 3/084 |
| 2024/0046082 A1 | 2/2024 | Yu et al. | | |
| 2024/0370693 A1* | 11/2024 | Zhang | ..................... | G06N 3/04 |

FOREIGN PATENT DOCUMENTS

| | | |
|---|---|---|
| KR | 20210049551 A | 5/2021 |
| KR | 20210072524 A | 6/2021 |
| KR | 20220025143 A | 3/2022 |

OTHER PUBLICATIONS

Gao Huang et al. Densely connected convolutional networks. Proceedings of the IEEE conference on computer vision and pattern recognition. 2017. 9pp.

* cited by examiner

| From \ To | $N_1$ | $N_2$ | $N_3$ | $N_4$ | $N_5$ | $N_6$ |
|---|---|---|---|---|---|---|
| $N_1$ | | $M_{12}$ $(Td_{12}, Ts_{12})$ | $M_{13}$ $(Td_{13}, Ts_{13})$ | $M_{14}$ $(Td_{14}, Ts_{14})$ | $M_{15}$ $(Td_{15}, Ts_{15})$ | $M_{16}$ $(Td_{16}, Ts_{16})$ |
| $N_2$ | $M_{21}$ $(Td_{21}, Ts_{21})$ | | $M_{23}$ $(Td_{23}, Ts_{23})$ | $M_{24}$ $(Td_{24}, Ts_{24})$ | $M_{25}$ $(Td_{25}, Ts_{25})$ | $M_{26}$ $(Td_{26}, Ts_{26})$ |
| $N_3$ | $M_{31}$ $(Td_{31}, Ts_{31})$ | $M_{32}$ $(Td_{32}, Ts_{32})$ | | $M_{34}$ $(Td_{34}, Ts_{34})$ | $M_{35}$ $(Td_{35}, Ts_{35})$ | $M_{36}$ $(Td_{36}, Ts_{36})$ |
| $N_4$ | $M_{41}$ $(Td_{41}, Ts_{41})$ | $M_{42}$ $(Td_{42}, Ts_{42})$ | $M_{43}$ $(Td_{43}, Ts_{43})$ | | $M_{45}$ $(Td_{45}, Ts_{45})$ | $M_{46}$ $(Td_{46}, Ts_{46})$ |
| $N_5$ | $M_{51}$ $(Td_{51}, Ts_{51})$ | $M_{52}$ $(Td_{52}, Ts_{52})$ | $M_{53}$ $(Td_{53}, Ts_{53})$ | $M_{54}$ $(Td_{54}, Ts_{54})$ | | $M_{56}$ $(Td_{56}, Ts_{56})$ |
| $N_6$ | $M_{61}$ $(Td_{61}, Ts_{61})$ | $M_{62}$ $(Td_{62}, Ts_{62})$ | $M_{63}$ $(Td_{63}, Ts_{63})$ | $M_{64}$ $(Td_{64}, Ts_{64})$ | $M_{65}$ $(Td_{65}, Ts_{65})$ | |

FIG.4

START

DETECT MEMORY USAGE FOR EACH LAYER OF
DEEP LEARNING MODEL, FIRST PROCESSING TIME
ACCORDING TO USE OF FIRST MEMORY AND
SECOND PROCESSING TIME ACCORDING TO
USE OF SECOND MEMORY                    ～501

DETERMINE OPTIMAL MEMORY FOR
EACH LAYER OF DEEP LEARNING MODEL
BASED ON OBJECTIVE FUNCTION              ～502

END

APPARATUS FOR PROCESSING A DEEP LEARNING MODEL AND A METHOD THEREOF

CROSS-REFERENCE TO RELATED APPLICATION

This application claims the benefit of and priority to Korean Patent Application No. 10-2022-0119485, filed on Sep. 21, 2022, the entire contents of which are incorporated herein by reference.

TECHNICAL FIELD

The present disclosure relates to a technique for minimizing the time required to process a deep learning model.

BACKGROUND

An artificial neural network (ANN) in the field of artificial intelligence is an algorithm for allowing a machine to learn by simulating a human neural structure. Recently, artificial neural networks have been utilized for image recognition, speech recognition, natural language processing, and the like, and have shown excellent results. A typical artificial neural network includes an input layer that receives an input, a hidden layer that actually learns, and an output layer that returns the result of an operation. An artificial neural network that includes a plurality of hidden layers is called a deep neural network (DNN).

An artificial neural network allows a computer to learn by itself based on data. When trying to solve a problem using an artificial neural network, it is typically necessary to prepare a suitable artificial neural network model and data to be analyzed. An artificial neural network model to solve a problem is trained based on data. Before training the model, it is generally necessary to first divide the data into two types—a training dataset and a validation dataset. The training dataset is used to train the model, and the validation dataset is used to verify the performance of the model.

There are various reasons for validating an artificial neural network model. For example, an artificial neural network developer may tune a model by modifying hyper parameters of the model based on the verification result of the model. As another example, model verification may be performed to select a suitable model from various models. Several reasons why the model verification may be necessary are explained in more detail as follows.

The model verification may be used to predict accuracy. Generally, the purpose of artificial neural networks is to achieve good performance on out-of-sample data not used for training. Therefore, after creating the model, it may be essential to check how well the model will perform on out-of-sample data. Because the model should not be verified using the train dataset, the accuracy of the model should be measured using the validation dataset separate from the training dataset.

The model verification may also be used to increase the performance of the model by tuning the model. For example, it is possible to prevent overfitting. Overfitting means that the model is over-trained on the train dataset. When training accuracy is high but validation accuracy is low, the occurrence of overfitting may be suspected. In addition, overfitting may be understood in more detail through training loss and validation loss. Occurrence of overfitting may be prevented to increase the validation accuracy. It is possible to prevent overfitting by using a scheme such as regularization or dropout.

A model (hereinafter, referred to as a deep learning model) on which the learning process and the verification process are completed may be applied to various systems and utilized for various purposes. However, because only a dynamic random access memory (DRAM) is typically used to process such a deep learning model, it is impossible to minimize the time required to process the deep learning model.

The matters described in this background section are intended to promote an understanding of the background of the disclosure and may include matters that are not already known to those of ordinary skill in the art.

SUMMARY

The present disclosure has been made to solve the above-mentioned problems while maintaining the above-mentioned advantages.

An aspect of the present disclosure provides an apparatus for processing a deep learning model and a method thereof capable of, for each layer of the deep learning model, detecting memory usage, a first processing time corresponding to a first memory (e.g., SRAM) being used and a second processing time corresponding to a second memory (e.g., DRAM) being used, and determining an optimal memory for each layer of the deep learning model based on an objective function, thereby minimizing the time required to process the deep learning model.

The technical problems to be solved by the present disclosure are not limited to the aforementioned problems, and any other technical problems not mentioned herein will be clearly understood from the following description by those having ordinary skill in the art to which the present disclosure pertains. Also, it may be easily understood that the objects and advantages of the present disclosure may be realized by the units and combinations thereof recited in the claims.

According to an embodiment of the present disclosure, an apparatus for processing a deep learning model includes a first memory, a second memory, and a controller. The controller is configured to, for each layer of the deep learning model: detect memory (e.g., at least one of SRAM and DRAM) usage, a first processing time corresponding to the first memory being used, and a second processing time corresponding to the second memory being used, and determine an optimal memory for each layer of the deep learning model based on an objective function.

According to an aspect, the first memory may include a static random access memory (SRAM), and the second memory includes a dynamic random access memory (DRAM).

According to an aspect, the controller may be configured to, in a process of determining the second node using a first node: detect memory usage corresponding to a first layer, detect a time that it takes to determine a second node when the first memory is used, and detect a time that it takes to determine the second node when the second memory is used. The controller may be further configured to, in a process of determining a third node using the first node: detect memory usage corresponding to a second layer, detect a time that it takes to determine the third node when the first memory is used, and detect a time that it takes to determine the third node when the second memory is used.

According to an aspect, the controller may be configured to release a memory allocated to the first layer and the second layer after the second node and the third node are determined.

According to an aspect, the controller may be configured to, in a process of determining a fourth node based on the second node and the third node: detect memory usage of a fourth layer corresponding to the second node, a time that it takes to process the fourth layer when the first memory is used, and a time that it takes to process the fourth layer when the second memory is used, and detect memory usage of a fifth layer corresponding to the third node, a time that it takes to process the fifth layer when the first memory is used, and a time that it takes to process the fifth layer when the second memory is used.

According to an aspect, the controller may be configured to release a memory allocated to the fourth layer and the fifth layer after the fourth node is determined.

According to an aspect, the controller may be configured to, in a process of determining a fifth node based on the first node and the third node: detect memory usage of a third layer corresponding to the first node, a time that it takes to process the third layer when the first memory is used, and a time that it takes to process the third layer when the second memory is used, and detect memory usage of a sixth layer corresponding to the third node, a time that it takes to process the sixth layer when the first memory is used, and a time that it takes to process the sixth layer when the second memory is used.

According to an aspect, the controller may be configured to release a memory allocated to the third layer and the sixth layer after the fifth node is determined.

According to an aspect, the controller may be configured to, in a process of determining a sixth node based on the fourth node and the fifth node: detect memory usage of a seventh layer corresponding to the fourth node, a time that it takes to process the seventh layer when the first memory is used, and a time that it takes to process the seventh layer when the second memory is used, and detect memory usage of an eighth layer corresponding to the fifth node, a time that it takes to process the eighth layer when the first memory is used, and a time that it takes to process the eighth layer when the second memory is used.

According to an aspect, the controller may be configured to release a memory allocated to the seventh layer and the eighth layer after the sixth node is determined.

According to another embodiment of the present disclosure, a method of processing a deep learning model includes, for each layer of the deep learning model, detecting, by a controller, memory usage, a first processing time corresponding to a first memory being used, and a second processing time corresponding to a second memory being used. The method further includes determining, by the controller, an optimal memory for each layer of the deep learning model based on an objective function.

According to an aspect, detecting the memory usage, the first processing time and the second processing time may include, in a process of determining the second node using a first node: detecting memory usage corresponding to a first layer, a time that it takes to determine a second node when the first memory is used, and a time that it takes to determine the second node when the second memory is used, and in a process of determining the third node using the first node: detecting memory usage corresponding to a second layer, a time that it takes to determine a third node when the first memory is used, and a time that it takes to determine the third node when the second memory is used.

According to an aspect, the method may further include releasing, by the controller, a memory allocated to the first layer and the second layer after the second node and the third node are determined.

According to an aspect, detecting of the memory usage, the first processing time and the second processing time may further include, in a process of determining a fourth node based on the second node and a third node: detecting memory usage of a fourth layer corresponding to the second node, a time that it takes to process the fourth layer when the first memory is used, and a time that it takes to process the fourth layer when the second memory is used, and detecting memory usage of a fifth layer corresponding to the third node, a time that it takes to process the fifth layer when the first memory is used, and a time that it takes to process the fifth layer when the second memory is used.

According to an aspect, the method may further include releasing, by the controller, a memory allocated to the fourth layer and the fifth layer after the fourth node is determined.

According to an aspect, detecting the memory usage, the first processing time and the second processing time may further include, in a process of determining a fifth node based on the first node and the third node: detecting memory usage of a third layer corresponding to the first node, a time that it takes to process the third layer when the first memory is used, and a time that it takes to process the third layer when the second memory is used, and detecting memory usage of a sixth layer corresponding to the third node, a time that it takes to process the sixth layer when the first memory is used, and a time that it takes to process the sixth layer when the second memory is used.

According to an embodiment, the method may further include releasing, by the controller, a memory allocated to the third layer and the sixth layer after the fifth node is determined.

According to an embodiment, detecting the memory usage, the first processing time and the second processing time may further include, in a process of determining a sixth node based on the fourth node and the fifth node: detecting memory usage of a seventh layer corresponding to the fourth node, a time that it takes to process the seventh layer when the first memory is used, and a time that it takes to process the seventh layer when the second memory is used, and detecting memory usage of an eighth layer corresponding to the fifth node, a time that it takes to process the eighth layer when the first memory is used, and a time that it takes to process the eighth layer when the second memory is used.

According to an embodiment, the method may further include releasing, by the controller, a memory allocated to the seventh layer and the eighth layer after the sixth node is determined.

BRIEF DESCRIPTION OF THE DRAWINGS

The above and other objects, features and advantages of the present disclosure may be more apparent from the following detailed description that it takes in conjunction with the accompanying drawings:

FIG. 4 is a diagram illustrating a result (table) of detecting memory usage, a first processing time and a second processing time, for each layer of a deep learning model by a controller provided in an apparatus for processing a deep learning model according to an embodiment of the present disclosure;

DETAILED DESCRIPTION

Figure 1:
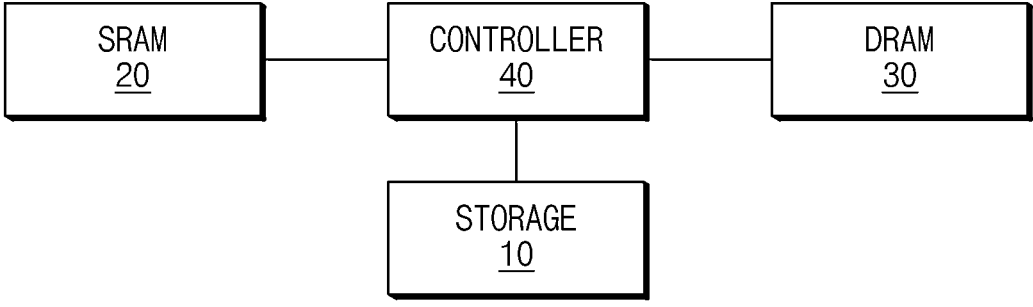
FIG. 1 is a block diagram illustrating an apparatus for processing a deep learning model according to an embodiment of the present disclosure.

Hereinafter, embodiments of the present disclosure are described in detail with reference to the accompanying drawings. In the accompanying drawings, the identical or equivalent component is designated by the identical reference numeral even when they are displayed in different drawings. Further, if it is considered that a specific description of related known configuration or function may cloud the gist of the present disclosure, a detailed description thereof may be omitted.

In describing components of the various embodiments of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

When a component, device, element, or the like of the present disclosure is described as having a purpose or performing an operation, function, or the like, the component, device, or element should be considered herein as being "configured to" meet that purpose or perform that operation or function.

FIG. 1 is a block diagram illustrating an apparatus for processing a deep learning model according to an embodiment of the present disclosure.

As shown in FIG. 1, an apparatus for processing a deep learning model according to an embodiment of the present disclosure may include a storage 10, a static random access memory (SRAM) 20, a dynamic random access memory (DRAM) 30, and a controller 40. Depending on a scheme of implementing an apparatus for processing a deep learning model according to an embodiment of the present disclosure, components may be combined with each other to be implemented as one, or some components may be omitted. In addition, an apparatus for processing a deep learning model according to an embodiment of the present disclosure may be mounted on an embedded board for a vehicle and a smartphone, or a processor provided on an embedded board for a vehicle and a processor provided in a smartphone may be implemented to perform the function of the apparatus for processing a deep learning model according to an embodiment of the present disclosure.

With reference to FIG. 1, the storage 10 may store various logic, algorithms and programs required in the processes of detecting memory usage, a first processing time according to use of the SRAM 20, and a second processing time according to use of the DRAM 30, for each layer of a deep learning model, and determining an optimal memory for each layer of the deep learning model based on an objective function. In an example, the layer may be expressed as a function (e.g., y=ax+b).

The storage 10 may include at least one type of a storage medium or memories such as a flash memory type, a hard disk type, a micro type, a card type (e.g., a secure digital (SD) card or an extreme digital (XD) card), and the like, and/or a random access memory (RAM), a static RAM, a read-only memory (ROM), a programmable ROM (PROM), an electrically erasable PROM (EEPROM), a magnetic memory (MRAM), a magnetic disk, and an optical disk type memory.

Figure 2:
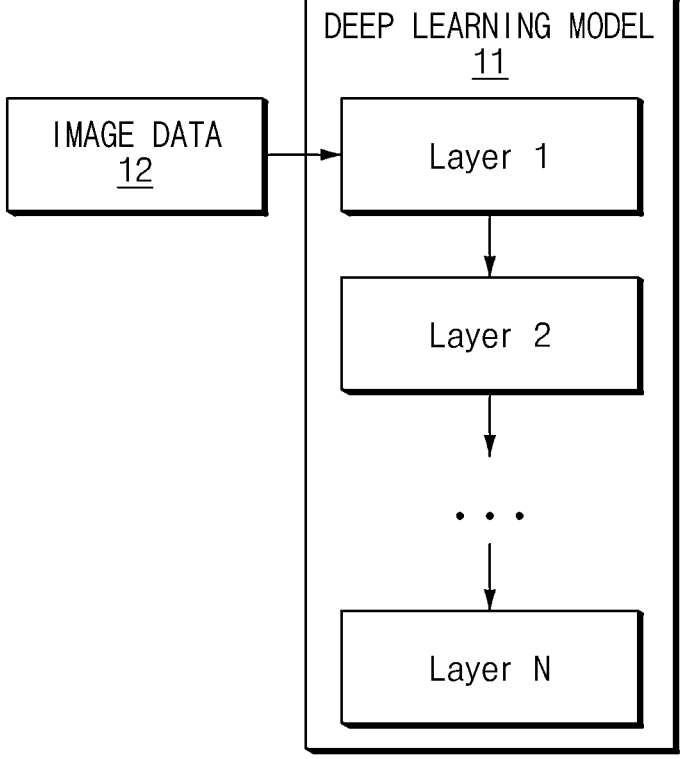
FIG. 2 is a block diagram illustrating a deep learning model used in an apparatus for processing a deep learning model according to an embodiment of the present disclosure.

In an example, the storage 10 may store a deep learning model as shown in FIG. 2 as an example.

FIG. 2 is a block diagram illustrating a deep learning model that may be processed by an apparatus for processing a deep learning model according to an embodiment of the present disclosure.

Referring briefly to FIG. 2, a deep learning model 11 may include a plurality of layers. And the controller 40 may process image data 12 based on the plurality of layers provided in the deep learning model 11 and may output the result accordingly.

Referring again to FIG. 1, the SRAM 20 may be a RAM having flip-flop type memory cells each composed of six MOSFETs. The SRAM 20 may continue to store data stored therein as long as a power supply continues supply power, and may be mainly used as a small-capacity memory or cache memory because a complex refresh clock is not required. Although the cost of the SRAM 20 may be higher than that of the DRAM 30, the operation speed may be about 5 times faster.

The DRAM 30 may store bits based on the amount of charge contained in each separate capacitor in an integrated circuit (IC). Because the stored data is lost as the electrons of the capacitor are leaked over time, a refresh process that periodically regenerates the data in the memory device may be required.

While the SRAM 20 may require six transistors to store 1 bit, the DRAM 30 may require one transistor and one capacitor. Accordingly, the DRAM 30 may have a simpler structure than the SRAM 20. DRAM 30 may thus be advantageous, particularly for high-density integration, may consume less power, and may be lower price, but may have a slower operating speed than the SRAM 20.

The controller 40 may be configured to perform overall control such that each component performs its function. The controller 40 may be implemented in the form of hardware or software, or may be implemented in a combination of hardware and software. Preferably, the controller 40 may be implemented as a microprocessor, but is not limited thereto.

In embodiments, the controller 40 may be configured to perform various controls required in the processes of detecting memory usage, a first processing time according to use of the SRAM 20, and a second processing time according to use of the DRAM 30, for each layer of a deep learning model, and determine an optimal memory for each layer of the deep learning model based on an objective function. In an example, the memory usage may be any one of SRAM 20 usage, DRAM 30 usage, and total usage of SRAM 20 and DRAM 30.

Operation of the controller 40, according to some embodiments, is described in more detail with reference to FIGS. 3 and 4.

Figure 3:
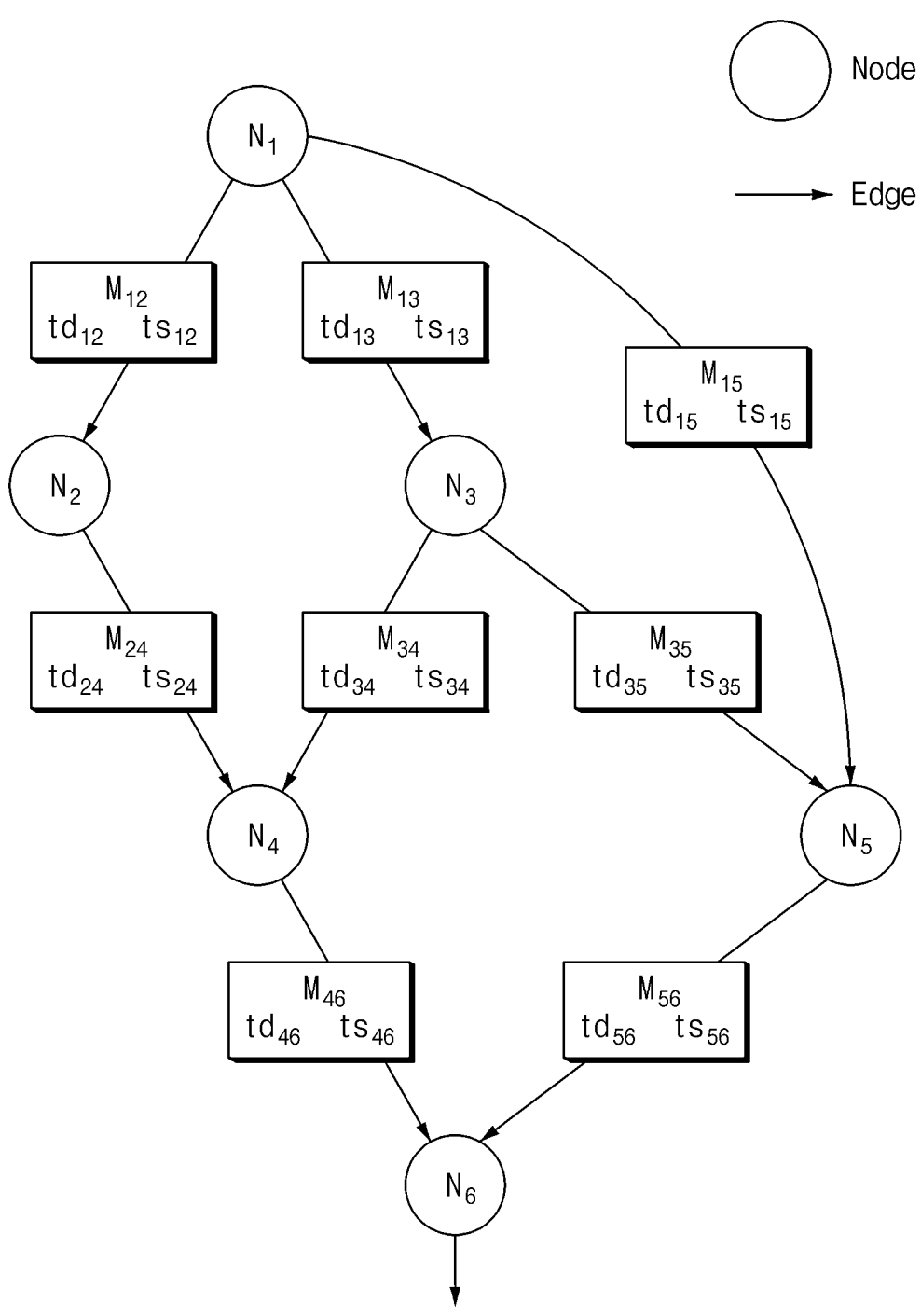
FIG. 3 is a diagram illustrating a process in which a controller provided in an apparatus for processing a deep learning model according to an embodiment of the present disclosure detects memory usage, a first processing time and a second processing time, for each layer of the deep learning model.

FIG. 3 is a diagram illustrating a process in which a controller provided in an apparatus for processing a deep learning model according to an embodiment of the present disclosure detects memory usage, a first processing time and a second processing time for each layer of the deep learning model.

In FIG. 3, nodes $N_1$ to $N_6$ represent a result (i.e., a result of calculating each layer) that may be determined by the controller 40 based on each layer provided in the deep learning model. Further, an arrow indicates each layer as an edge, and data displayed on each edge represents memory usage $M_x$, the first processing time $ts_x$, and the second processing time $td_x$. In an example, the layer may be expressed as a function.

In an example, in a first operation, the controller 40 may directly determine $N_2$ and $N_3$ by using $N_1$. Because the controller 40 directly determines $N_2$ and $N_3$ by using $N_1$, the controller 40 may process the first layer used to determine $N_2$ and the second layer used to determine $N_3$ in parallel. In various examples, the controller 40 may allocate the SRAM 20 to both the first layer and the second layer, allocate the SRAM 20 to the first layer and allocate the DRAM 30 to the second layer, allocate the DRAM 30 to the first layer and allocate the SRAM 20 to the second layer, or allocate the DRAM 30 to both the first layer and the second layer. In an example, the controller 40 may allocate the SRAM 20 to the first layer and the second layer in a range not exceeding the total capacity of the SRAM 20, and when the total capacity of the SRAM 20 is exceeded (i.e., when the capacity of the SRAM 20 is insufficient), allocate the DRAM 30. Accordingly, the SRAM 20 may be allocated to at least one of the first layer and the second layer. In an example, $N_5$ cannot be determined only by the result of calculating the third layer, so the controller 40 may not calculate the third layer. Accordingly, no memory is allocated to the third layer.

In the process of determining $N_2$ by applying $N_1$ to the first layer, i.e., in the process of transitioning from $N_1$ to $N_2$, the controller 40 may detect the memory usage $M_{12}$ corresponding to the first layer, a time $ts_{12}$ that it takes to determine $N_2$ when the SRAM 20 is used, and a time $td_{12}$ that it takes to determine $N_2$ when the DRAM 30 is used.

In the process of determining $N_3$ by applying $N_1$ to the second layer, the controller 40 may detect the memory usage $M_{13}$ corresponding to the second layer, a time $ts_{12}$ that it takes to determine $N_3$ when the SRAM 20 is used, and a time $td_{13}$ that it takes to determine $N_3$ when the DRAM 30 is used.

In an example, after both $N_2$ and $N_3$ are determined as described above, the controller 40 may release the memory allocated to the first layer and the second layer.

In a second operation, in order to determine $N_4$ based on $N_2$ and $N_3$, the controller 40 may process the fourth layer to which $N_2$ is applied and the fifth layer to which $N_3$ is applied in parallel. In an example, the fourth layer and the fifth layer may be functions different from each other.

In the calculating process of applying $N_2$ to the fourth layer, the controller 40 may detect the memory usage $M_{24}$ corresponding to the fourth layer, a time $ts_{24}$ that it takes to complete the calculation when the SRAM 20 is used, and a time $td_{24}$ that it takes to complete the calculation when the DRAM 30 is used.

In the calculating process of applying $N_3$ to the fifth layer, the controller 40 may detect the memory usage $M_{34}$ corresponding to the fifth layer, a time $ts_{34}$ that it takes to complete the calculation when the SRAM 20 is used, and a time $td_{34}$ that it takes to complete the calculation when the DRAM 30 is used.

In an example, after both the calculation on the fourth layer and the calculation on the fifth layer are completed as described above, i.e., after $N_4$ is determined, the controller 40 may release the memory allocated to the fourth layer and the fifth layer.

In a third operation, in order to determine $N_5$ based on $N_1$ and $N_3$, the controller 40 may process the third layer to which $N_1$ is applied and the sixth layer to which $N_3$ is applied in parallel. In an example, the third layer and the sixth layer may be functions different from each other.

In the calculating process of applying $N_1$ to the third layer, the controller 40 may detect the memory usage Mas corresponding to the third layer, a time $ts_{15}$ that it takes to complete the calculation when the SRAM 20 is used, and a time tolls that it takes to complete the calculation when the DRAM 30 is used.

In the calculating process of applying $N_3$ to the sixth layer, the controller 40 may detect the memory usage $M_{35}$ corresponding to the sixth layer, a time $ts_{35}$ that it takes to complete the calculation when the SRAM 20 is used, and a time $td_{35}$ that it takes to complete the calculation when the DRAM 30 is used.

In an example, after both the calculation on the third layer and the calculation on the sixth layer are completed as described above, i.e., after $N_5$ is determined, the controller 40 may release the memory allocated to the third layer and the sixth layer.

In a fourth operation, in order to determine $N_6$ based on $N_4$ and $N_5$, the controller 40 may process the seventh layer to which $N_4$ is applied and the eighth layer to which $N_5$ is applied in parallel. In this case, the seventh layer and the eighth layer may be functions different from each other.

In the calculating process of applying $N_4$ to the seventh layer, the controller 40 may detect the memory usage $M_{46}$ corresponding to the seventh layer, a time $ts_{46}$ that it takes to complete the calculation when the SRAM 20 is used, and a time $td_{46}$ that it takes to complete the calculation when the DRAM 30 is used.

In the calculating process of applying $N_5$ to the eighth layer, the controller 40 may detect the memory usage $M_{56}$ corresponding to the eighth layer, a time $ts_{56}$ that it takes to complete the calculation when the SRAM 20 is used, and a time $td_{56}$ that it takes to complete the calculation when the DRAM 30 is used.

In an example, after both the calculation on the seventh layer and the calculation on the eighth layer are completed as described above, i.e., after $N_6$ is determined, the controller 40 may release the memory allocated to the seventh layer and the eighth layer.

In some examples, the second operation and the third operation described above may be processed in parallel. In an example, the controller 40 may allocate the SRAM 20 to the third layer, the fourth layer, the fifth layer and the sixth layer in a range not exceeding the total capacity of the SRAM 20, and when the total capacity of the SRAM 20 is exceeded, allocate the DRAM 30 to the layers to which the SRAM 20 is allocated. Likewise, after both $N_4$ and $N_5$ are determined, the memory allocated to the third layer, the fourth layer, the fifth layer and the sixth layer may be released.

FIG. 4 is a table illustrating a result of detecting memory usage, a first processing time, and a second processing time, for each layer of a deep learning model by a controller provided in an apparatus for processing a deep learning model according to an embodiment of the present disclosure.

In the table shown in FIG. 4, the vertical axis and the horizontal axis indicate nodes, respectively, and the table values indicate memory usage required to calculate the edge (layer) between nodes, a first processing time when the SRAM 20 is used and a second processing time when the DRAM 30 is used, respectively. With reference to FIG. 4, a 6×6 node case is described as an example, but, in other examples, the number of nodes may be arbitrarily changed according to the designer's intention.

The controller 40 may determine an optimal memory for each layer of the deep learning model based on an objective function. In an example, the objective function may be expressed as in Equation 1:

$$\text{Minimize } \sum_{i=1}^{N} \sum_{j=1}^{N} (td_{ij} \times d_{ij} + ts_{ij} \times s_{ij}) \qquad \text{Equation 1}$$

where $td_{ij}$ represents the time it takes to transition from node i to node j when the DRAM 30 is used, $d_{ij}$ is '1' when the DRAM 30 is used and '0' when the DRAM 30 is not in use, $ts_{ij}$ is the time it takes to transition from the node i to node j when the SRAM 20 is used, and $s_{ij}$ is '1' when the SRAM 20 is used and '0' when the SRAM 20 is not in use.

The controller 40 may obtain an optimal solution of the objective function based on dynamic programming.

Figure 5:
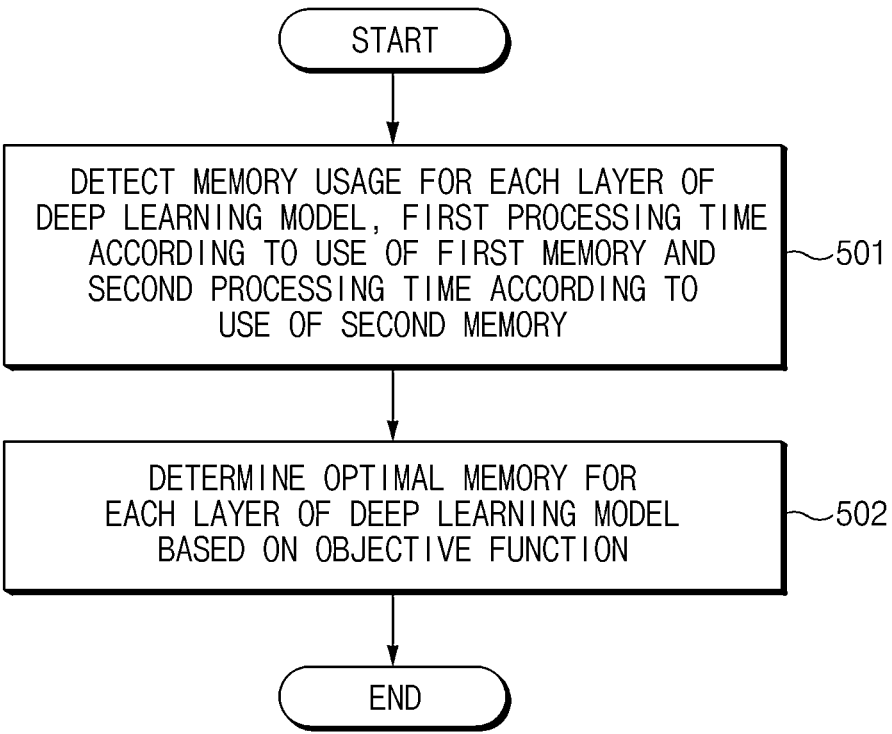
FIG. 5 is a flowchart illustrating a method of processing a deep learning model according to an embodiment of the present disclosure.

FIG. 5 is a flowchart illustrating a method of processing a deep learning model according to an embodiment of the present disclosure.

In 501, the controller 40 may detect, for each layer of the deep learning model, a memory usage, a first processing time corresponding to the SRAM 20 being used, and a second processing time corresponding to the DRAM 30 being used.

In 502, the controller 40 may determine an optimal memory for each layer of the deep learning model based on an objective function.

Figure 6:
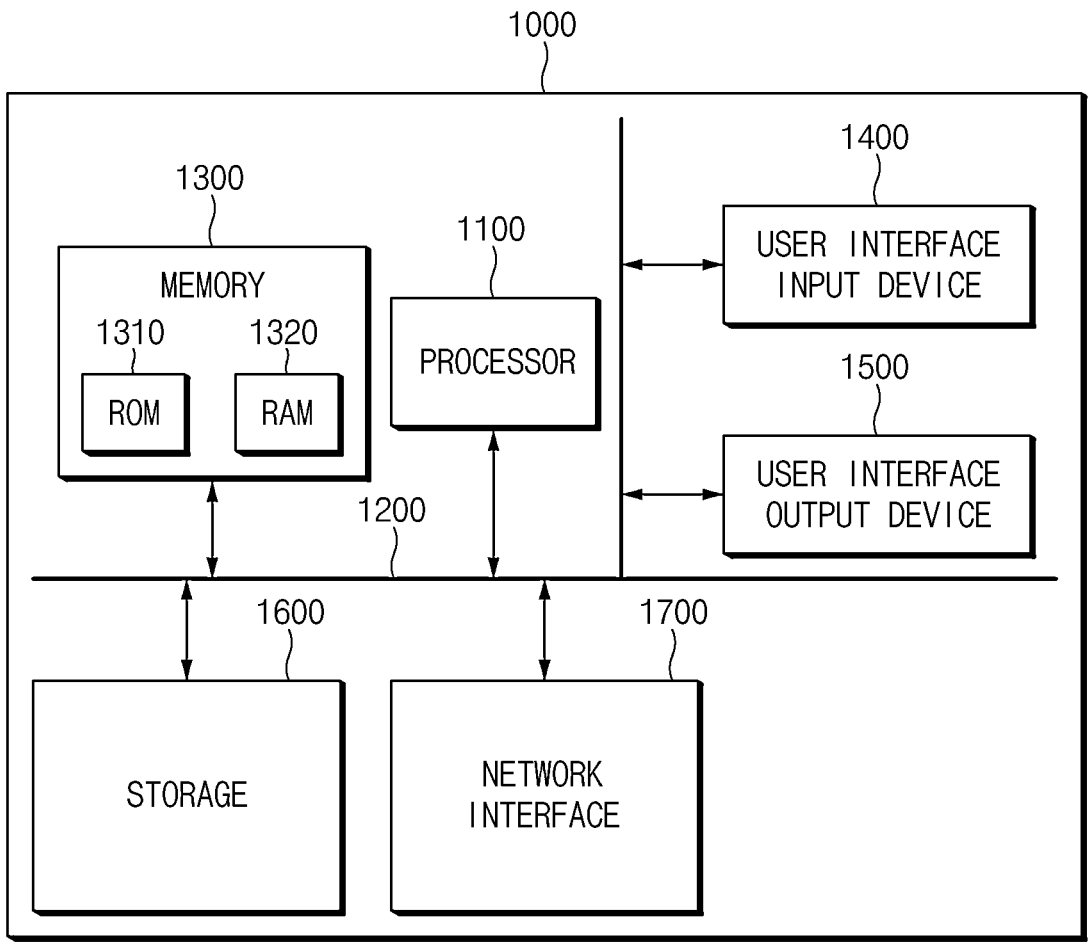
FIG. 6 is a block diagram illustrating a computing system for executing a method of processing a deep learning model according to an embodiment of the present disclosure.

FIG. 6 is a block diagram illustrating a computing system for executing a method of processing a deep learning model according to an embodiment of the present disclosure.

Referring to FIG. 6, a method of processing a deep learning model according to an embodiment of the present disclosure described above may be implemented through a computing system 1000. The computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that executes instructions stored in the memory 1300 and/or the storage 1600. The memory 1300 and the storage 1600 may include various types of volatile or non-volatile storage media. For example, the memory 1300 may include a Read Only Memory (ROM) 1310 and a Random Access Memory (RAM) 1320.

In various embodiments, the processes of the method or algorithm described in relation to the embodiments of the present disclosure may be implemented directly by hardware executed by the processor 1100, a software module, or a combination thereof. The software module may reside in a storage medium (e.g., the memory 1300 and/or the storage 1600), such as a RAM, a flash memory, a ROM, an EPROM, an EEPROM, a register, a hard disk, solid state drive (SSD), a detachable disk, or a CD-ROM. The storage medium may be coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another embodiment, the processor 1100 and the storage medium may reside in the user terminal as an individual component.

As described above, the apparatus and method for processing a deep learning model according to embodiments of the present disclosure may detect memory usage for each layer of the deep learning model, a first processing time when a first memory (e.g., SRAM) is used and a second processing time when second memory (e.g., DRAM) is used, and determine an optimal memory for each layer of the deep learning model based on an objective function, thereby minimizing the time required to process the deep learning model.

Although example embodiments of the present disclosure have been described for illustrative purposes, those having ordinary skill in the art should appreciate that various modifications, additions and substitutions are possible, without departing from the scope and spirit of the disclosure.

Therefore, the embodiments disclosed in the present disclosure are provided for the sake of descriptions, and it should be understood that such embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for processing a deep learning model, the apparatus comprising:
   a first memory;
   a second memory;
   a processor; and
   a non-transitory storage medium having stored thereon computer-readable instructions that, when executed by the processor, cause the apparatus:
      for each layer of the deep learning model, detect memory usage, a first processing time corresponding to the first memory being used, and a second processing time corresponding to the second memory being used, wherein the computer-readable instructions, when executed by the processor, cause the apparatus to i) in a process of determining a second node using a first node, detect memory usage corresponding to a first layer, a time that it takes to determine a second node when the first memory is used, and a time that it takes to determine the second node when the second memory is use and ii) in a process of determining a third node using the first node, detect memory usage corresponding to a second layer, a time that it takes to determine a third node when the first memory is used, and a time that it takes to determine the third node when the second memory is used,
      determine an optimal memory for each layer of the deep learning model based on by optimizing an objective function based on the memory usage, the first processing time, and the second processing time, allocate one or both of the first memory or the second memory to each of the first layer and the second layer according to the optimal memory for each of the first layer and the second layer, and process the first layer and the second layer in parallel, wherein processing the first layer and the second layer includes i) processing the first layer using the one or both of the first memory or the second memory allocated to the first layer and i) in parallel with processing the first layer using the one or both of the first memory or the second memory allocated to the first layer, processing the second layer using the one or both of the first memory or the second memory allocated to the second layer.

2. The apparatus of claim 1, wherein:

the first memory includes a static random access memory (SRAM), and the second memory includes a dynamic random access memory (DRAM).

3. The apparatus of claim 1, wherein the computer-readable instructions, when executed by the processor, cause the apparatus to release a memory allocated to the first layer and the second layer after the second node and the third node are determined.

4. The apparatus of claim 3, wherein the computer-readable instructions, when executed by the processor, cause the apparatus to, in a process of determining a fourth node based on the second node and the third node:

detect memory usage of a fourth layer corresponding to the second node, a time that it takes to process the fourth layer when the first memory is used, and a time that it takes to process the fourth layer when the second memory is used, and detect memory usage of a fifth layer corresponding to the third node, a time that it takes to process the fifth layer when the first memory is used, and a time that it takes to process the fifth layer when the second memory is used.

5. The apparatus of claim 4, wherein the computer-readable instructions, when executed by the processor, cause the apparatus to release a memory allocated to the fourth layer and the fifth layer after the fourth node is determined.

6. The apparatus of claim 5, wherein the computer-readable instructions, when executed by the processor, cause the apparatus to, in a process of determining a fifth node based on the first node and the third node:

detect memory usage of a third layer corresponding to the first node, a time that it takes to process the third layer when the first memory is used, and a time that it takes to process the third layer when the second memory is used, and detect memory usage of a sixth layer corresponding to the third node, a time that it takes to process the sixth layer when the first memory is used, and a time that it takes to process the sixth layer when the second memory is used.

7. The apparatus of claim 6, wherein the computer-readable instructions, when executed by the processor, cause the apparatus to release a memory allocated to the third layer and the sixth layer after the fifth node is determined.

8. The apparatus of claim 7, wherein the computer-readable instructions, when executed by the processor, cause the apparatus to, in a process of determining a sixth node based on the fourth node and the fifth node:

detect memory usage of a seventh layer corresponding to the fourth node, a time that it takes to process the seventh layer when the first memory is used, and a time that it takes to process the seventh layer when the second memory is used, and detect memory usage of an eighth layer corresponding to the fifth node, a time that it takes to process the eighth layer when the first memory is used, and a time that it takes to process the eighth layer when the second memory is used.

9. The apparatus of claim 8, wherein the computer-readable instructions, when executed by the processor, cause the apparatus to release a memory allocated to the seventh layer and the eighth layer after the sixth node is determined.

10. A method of processing a deep learning model, the method comprising:

for each layer of the deep learning model, detecting, by a processor, memory usage, a first processing time corresponding to a first memory being used, and a second processing time corresponding to a second memory being used, including i) in a process of determining a second node using a first node, detecting memory usage corresponding to a first layer, a time that it takes to determine a second node when the first memory is used, and a time that it takes to determine the second node when the second memory is used and ii) in a process of determining a third node using the first node, detecting memory usage corresponding to a second layer, a time that it takes to determine a third node when the first memory is used, and a time that it takes to determine the third node when the second memory is used;

determining, by the processor, an optimal memory for each layer of the deep learning model based on an objective function based on the memory usage, the first processing time, and the second processing time;

allocating, by the processor, one or both of the first memory or the second memory to each of the first layer and the second layer according to the optimal memory for each of the first layer and the second layer; and processing, by the processor, the first layer and the second layer in parallel, including i) processing the first layer using the one or both of the first memory or the second memory allocated to the first layer and i) in parallel with processing the first layer using the one or both of the first memory or the second memory allocated to the first layer, processing the second layer using the one or both of the first memory or the second memory allocated to the second layer.

11. The method of claim 10, wherein:

the first memory includes a static random access memory (SRAM), and the second memory includes a dynamic random access memory (DRAM).

12. The method of claim 10, further comprising releasing, by the processor, a memory allocated to the first layer and the second layer after the second node and the third node are determined.

13. The method of claim 12, wherein detecting the memory usage, the first processing time and the second processing time further includes, in a process of determining a fourth node based on the second node and a third node:

detecting memory usage of a fourth layer corresponding to the second node, a time that it takes to process the fourth layer when the first memory is used, and a time that it takes to process the fourth layer when the second memory is used, and detecting memory usage of a fifth layer corresponding to the third node, a time that it takes to process the fifth layer when the first memory is used, and a time that it takes to process the fifth layer when the second memory is used.

14. The method of claim 13, further comprising releasing, by the processor, a memory allocated to the fourth layer and the fifth layer after the fourth node is determined.

15. The method of claim 14, wherein detecting the memory usage, the first processing time and the second processing time further includes, in a process of determining a fifth node based on the first node and the third node:

detecting memory usage of a third layer corresponding to the first node, a time that it takes to process the third layer when the first memory is used, and a time that it takes to process the third layer when the second memory is used, and detecting memory usage of a sixth layer corresponding to the third node, a time that it takes to process the sixth layer when the first memory is used, and a time that it takes to process the sixth layer when the second memory is used.

16. The method of claim 15, further comprising releasing, by the processor, a memory allocated to the third layer and the sixth layer after the fifth node is determined.

17. The method of claim 16, wherein the detecting of the memory usage, the first processing time and the second processing time further includes, in a process of determining a sixth node based on the fourth node and the fifth node:

detecting memory usage of a seventh layer corresponding to the fourth node, a time that it takes to process the seventh layer when the first memory is used, and a time that it takes to process the seventh layer when the second memory is used, and detecting memory usage of an eighth layer corresponding to the fifth node, a time that it takes to process the eighth layer when the first memory is used, and a time that it takes to process the eighth layer when the second memory is used.

18. The method of claim 17, further comprising releasing, by the processor, a memory allocated to the seventh layer and the eighth layer after the sixth node is determined.

* * * * *